(12) United States Patent
Ishikawa et al.

(10) Patent No.: US 8,209,114 B2
(45) Date of Patent: Jun. 26, 2012

(54) TRAFFIC INFORMATION GENERATING APPARATUS AND TRAFFIC INFORMATION GENERATING METHOD

(75) Inventors: Hiroki Ishikawa, Okazaki (JP); Kenji Nagase, Okazaki (JP)

(73) Assignee: Aisin AW Co., Ltd. (JP)

( * ) Notice: Subject to any disclaimer, the term of this patent is extended or adjusted under 35 U.S.C. 154(b) by 1304 days.

(21) Appl. No.: 11/898,691

(22) Filed: Sep. 14, 2007

(65) Prior Publication Data

US 2008/0082251 A1    Apr. 3, 2008

(30) Foreign Application Priority Data

Sep. 29, 2006  (JP) ................................ 2006-266408

(51) Int. Cl.
*G08G 1/00* (2006.01)

(52) U.S. Cl. ........ 701/118; 701/117; 701/119; 340/905; 340/933; 340/934; 340/988; 340/989; 370/235; 370/354; 370/400; 370/452; 370/454; 714/49; 714/805; 379/111; 379/138; 455/426.1

(58) Field of Classification Search .................. 701/117, 701/118, 119, 200, 208, 211; 340/905, 933, 340/934, 988, 989, 992, 990, 995.13; 370/235, 370/354, 400, 452, 454, 503; 714/49, E11.043, 714/805; 379/111, 138; 455/426.1
See application file for complete search history.

(56) References Cited

U.S. PATENT DOCUMENTS

| 6,542,808 B2 * | 4/2003 | Mintz ............................. 701/117 |
| 7,026,958 B2 * | 4/2006 | Wainfan et al. .......... 340/995.13 |
| 7,328,101 B2 * | 2/2008 | Ishikawa et al. .............. 701/209 |
| 7,536,254 B2 * | 5/2009 | Kumagai et al. .............. 701/117 |
| 7,634,355 B2 * | 12/2009 | Ishikawa et al. .............. 701/209 |
| 7,680,588 B2 * | 3/2010 | Tsukamoto ................... 701/117 |
| 2006/0064235 A1 * | 3/2006 | Ishikawa et al. .............. 701/117 |
| 2008/0109157 A1 * | 5/2008 | Ishikawa et al. .............. 701/207 |

FOREIGN PATENT DOCUMENTS

| DE | 101 33 387 | 1/2003 |
| JP | 2006-031422 | 2/2006 |
| JP | 2006-244265 | 9/2006 |

OTHER PUBLICATIONS

Shawn M. Turner et al., Probe Vehicle Sample Sizes for Real-Time Information: The Houston Experience, Jul. 1995, pp. 3-10, XP-002538454, Downloaded on Jul. 23, 2009 at 07:02 from IEE Xplore.
Alexandre Torday et al., "Floating Car Data: Travel Time Estimation in Urban Networks", pp. 1-12. XP-002538453.
Li Wang et al., "Probe Vehicle Sampling for Real-Time Traffic Data Collection", Sep. 13-16, 2005, pp. 886-888, Proceedings of the 8¯th International IEEE Conference on Intelligent Transportation Systems, Vienna, Austria.

* cited by examiner

*Primary Examiner* — James Trammell
*Assistant Examiner* — McDieunel Marc
(74) *Attorney, Agent, or Firm* — Bacon & Thomas, PLLC (57) ABSTRACT

A CPU specifies factors related to the month, the day of the week, and a time period including the current point in time, based on time data obtained by a timer. The CPU also specifies factors that are related to a grid ID and a road category of a given link, based on map display data, link data, and the like stored in an update map information database. The CPU then reads a sample collection number indicating the number of samples of probe information required to generate traffic information for that link and in sequence for other links. When a center traffic information DB contains stored therein, samples of probe information equal to or greater than the sample collection number for a link, the CPU generates the traffic information for that link and stores the generated traffic information as current traffic information.

21 Claims, 5 Drawing Sheets

| MESH ID 51A | MONTH 51B | DAY OF THE WEEK 51C | | ROAD CATEGORY 51D | 0:00~5:59 | 6:00~12:59 | 13:00~19:59 | 20:00~23:59 51E |
|---|---|---|---|---|---|---|---|---|
| 1 | JAN | MO TU WE TH FR | GENERAL | EXPRESSWAYS | 1 | 1 | 1 | 1 |
| | | | | WITH TRAFFIC LIGHTS | 3 | 5 | 5 | 3 |
| | | | | WITHOUT TRAFFIC LIGHTS | 1 | 3 | 3 | 1 |
| | FEB | | | SMALL STREETS | 3 | 5 | 5 | 3 |
| | | SAT,SUN & HOL | GENERAL | EXPRESSWAYS | 1 | 1 | 1 | 1 |
| | MAR | | | WITH TRAFFIC LIGHTS | 3 | 3 | 3 | 3 |
| | | | | WITHOUT TRAFFIC LIGHTS | 1 | 1 | 3 | 1 |
| | | | | SMALL STREETS | 1 | 3 | 5 | 1 |
| | APR | MO-FR | | | | | | |
| | MAY | | | | ⋯ | ⋯ | ⋯ | ⋯ |
| | JUN | SAT,SUN & HOL | | | | | | |
| | ⋮ | ⋮ | | | | | | |
| 2 | | | | | | | | |
| 3 | | | | | | | | |
| 4 | | | | | | | | |
| ⋯ | | | | | | | | |
| 4500 | | | | | | | | |

| 51A | 51B | 51C | 51D | 51E | | | |
|---|---|---|---|---|---|---|---|
| MESH ID | MONTH | DAY OF THE WEEK | ROAD CATEGORY | 0:00~5:59 | 6:00~12:59 | 13:00~19:59 | 20:00~23:59 |
| 1 | JAN | MO TU WE TH FR | EXPRESSWAYS | 1 | 1 | 1 | 1 |
| | | | 2 OR MORE LANES (GENERAL) | 1 | 3 | 3 | 1 |
| | | | ONE LANE (GENERAL) | 3 | 3 | 3 | 3 |
| | | | SMALL STREETS | 3 | 5 | 5 | 3 |
| | FEB | SAT,SUN & HOL | EXPRESSWAYS | 1 | 1 | 1 | 1 |
| | | | 2 OR MORE LANES (GENERAL) | 3 | 3 | 3 | 1 |
| | | | ONE LANE (GENERAL) | 1 | 3 | 3 | 3 |
| | MAR | | SMALL STREETS | 3 | 3 | 5 | 1 |
| | APR | MO-FR | | | | | |
| | MAY | | | | | | |
| | JUN | SAT,SUN & HOL | | | | | |
| | ⋮ | ⋮ | ⋮ | ⋮ | ⋮ | ⋮ | ⋮ |
| 2 | | | | | | | |
| 3 | | | | | | | |
| 4 | | | | | | | |
| ⋯ | | | | | | | |
| 4500 | | | | | | | |

51

TRAFFIC INFORMATION GENERATING APPARATUS AND TRAFFIC INFORMATION GENERATING METHOD

INCORPORATION BY REFERENCE

The disclosure of Japanese Patent Application No. 2006-266408 filed on Sep. 29, 2006 including the specification, drawings and abstract is incorporated herein by reference in its entirety.

BACKGROUND OF THE INVENTION

1. Field of the Invention

The present invention relates to a traffic information generating apparatus and a traffic information generating method for generating traffic information including congestion information. In particular, the present invention relates to a traffic information generating apparatus and a traffic information generating method for generating traffic information, based on probe information collected from a navigation apparatus installed in a probe car.

2. Description of the Related Art

In recent years, various types of traffic information generating apparatus and traffic information generating methods have been proposed which use a traveling vehicle as a sensor ("probe car") and which generate traffic information including congestion information based on probe information, such as speed (time/location), that has been collected from the probe car.

For example, depending on the circumstances of collection of the probe information, i.e., for example, depending on the number of probe cars traveling a given road section that is a target for the collection of information and further depending on the driving speeds of the probe cars, the road length, i.e. the length of a traffic information judging section, used for judging the road conditions including the level of traffic congestion, can be variably set. Traffic information generating routes, defined by vehicular traveled route data, are divided into the variable traffic information judging sections, so that traffic information including an average travel time, the level of congestion, and an average speed is obtained for each judging section. One example of a traffic information generating apparatus and a traffic information generating method is disclosed in Japanese Patent Application Publication No. JP-A-2006-31422; (paragraphs 0022 to 0064 and FIGS. 1 to 12) wherein, when the number of probe cars is small or when the driving speed of the probe cars is high, the judging sections are longer, whereas when the number of probe cars is large or when the driving speed of the probe cars is low, the judging sections are shorter.

SUMMARY

According to the system disclosed in Japanese Patent Application Publication No. JP-A-2006-31422, the probe information is received from a plurality of probe cars, so that road sections that correspond to the probe information are identified by a map matching process with the use of map data stored in a map information database (hereinafter "map information DB"). For each of the probe cars, vehicular traveled route data is generated, based on the probe information. The thus generated traffic information includes road sections set to be relatively short when the number of probe cars traveling through one section is large, and set to be relatively long when the number of probe cars traveling through one section is small. In this system, when the number of probe cars is small (for example, one), if the road is a road on which driving conditions can easily change, the traffic information is generated by setting the road sections to be long. Thus, variation in the probe information for such road sections is large, and a problem arises in that the level of accuracy of the traffic information is thereby lowered. For example, when the traffic is light on a given road section, variation in the probe information related to the travel time and the vehicle speed in the road section increases, depending on whether or not the probe cars are stopped at a traffic light, thus lowering the level of accuracy of the traffic information.

It is an object of the present invention to solve the problems described above by providing a traffic information generating apparatus and a traffic information generating method with which it is possible to generate traffic information with a high level of accuracy, based on an appropriately-determined sample collection number indicating a required number of samples of probe information.

The traffic information generating apparatus according to a first aspect of the present invention stores therein, in correspondence with each of plural road categories, a sample collection number indicating the number of samples of probe information required to generate traffic information appropriate for a given link. Based on the sample collection number, when a judgment has been made that the required number of samples of probe information has been collected, traffic information for the corresponding link is generated.

In this manner, it is possible to set the sample collection numbers, each indicating the number of samples of probe information required for each link, so that they vary in correspondence with the road categories. More specifically, it is possible to set, in advance, the sample collection numbers in such a manner that they change in correspondence with the levels of reliability of the probe information. Thus, it is possible to generate traffic information that has an even higher level of accuracy with a smaller number of samples. For example, when the road on which a probe car is driven is in the category of a national expressway or an expressway having no traffic lights, because the level of reliability of the probe information is high, it is possible to increase the level of accuracy of the generated traffic information by setting, in advance, the sample collection number to a smaller number (for example, "1").

According to a second aspect of the present invention, a sample collection number is stored for each of different areas. Firstly, for each of the links, an area that contains the link is determined. Then, based on the sample collection number corresponding to the determined area, a judgment is made as to whether or not the number of samples of probe information actually collected has reached that number required in order to generate the traffic information for the link, i.e. the sample collection number. In this manner, it is possible to change the sample collection number in correspondence with the area of the link. As a result, it is possible to set the sample collection numbers with a high level of accuracy, taking the differences between different localities into consideration.

According to a third aspect of the present invention, the sample collection numbers are determined in correspondence with a time period, i.e. at least one of the month, the day of the week, and/or the hour of the day. With such an embodiment, it is possible to use the time of the year and the day of the week and/or the time of the day as a factor, optionally in combination with another factor or factors, in determination of sample collection numbers. In this manner, it is possible to further improve the level of accuracy of the sample collection numbers that are set in correspondence with the road category.

According to a fourth aspect of the present invention, the sample collection number is determined in accordance with whether or not road to be traveled has traffic lights. With this embodiment, it is possible to increase the level of accuracy of the traffic information, by setting the sample collection number for each of the links on a road having traffic lights, to a larger number, and setting the sample collection number for each of the links on a road having no traffic lights, to a smaller number (for example, 1).

According to a fifth aspect of the present invention, the sample collection number is generated taking into consideration, as at least one factor, the number of lanes in each road. In this manner also, it is possible to increase the level of accuracy of the traffic information by setting the sample collection number for each of the links of a one lane road to a larger number, while setting the sample collection number for each of the links in a road having two or more lanes, to a smaller number (for example, 1).

According to a sixth aspect (method) of the present invention, firstly, the probe information is collected from the navigation apparatus of each probe vehicle. Then a judgment is made as to whether or not the required number of samples of probe information has been collected, based on a sample collection number that has been stored in advance for a given road category and that indicates the number of samples of probe information required to generate the traffic information for a link. Subsequently, in a case where it has been judged that the required number of samples of the probe information has been collected, the traffic information for that link is generated. In this manner, it is possible to set the sample collection numbers, each indicating the number of samples of the probe information required, in order to generate the traffic information for the links, in such a manner that the sample collection numbers change in correspondence with the different road categories. More specifically, it is possible to set, in advance, the sample collection numbers in such a manner that the sample collection numbers change in correspondence with the levels of reliability of the probe information. Thus, it is possible to generate traffic information that has an even higher level of accuracy with a smaller number of samples. For example, when the road category of a road on which a probe car is driven is a national expressway or an urban expressway that has no traffic lights, because the level of reliability of the probe information is high, it is possible to generate the traffic information that has a higher level of accuracy by setting, in advance, the sample collection number to a smaller number (for example, by setting the sample collection number to "1").

DESCRIPTION OF THE PREFERRED EMBODIMENTS

A preferred embodiment of a traffic information generating apparatus and a traffic information generating method according to the present invention, in which the apparatus and the method of the present invention are embodied in a navigation system, is explained below with reference to the accompanying drawings.

Figure 1:
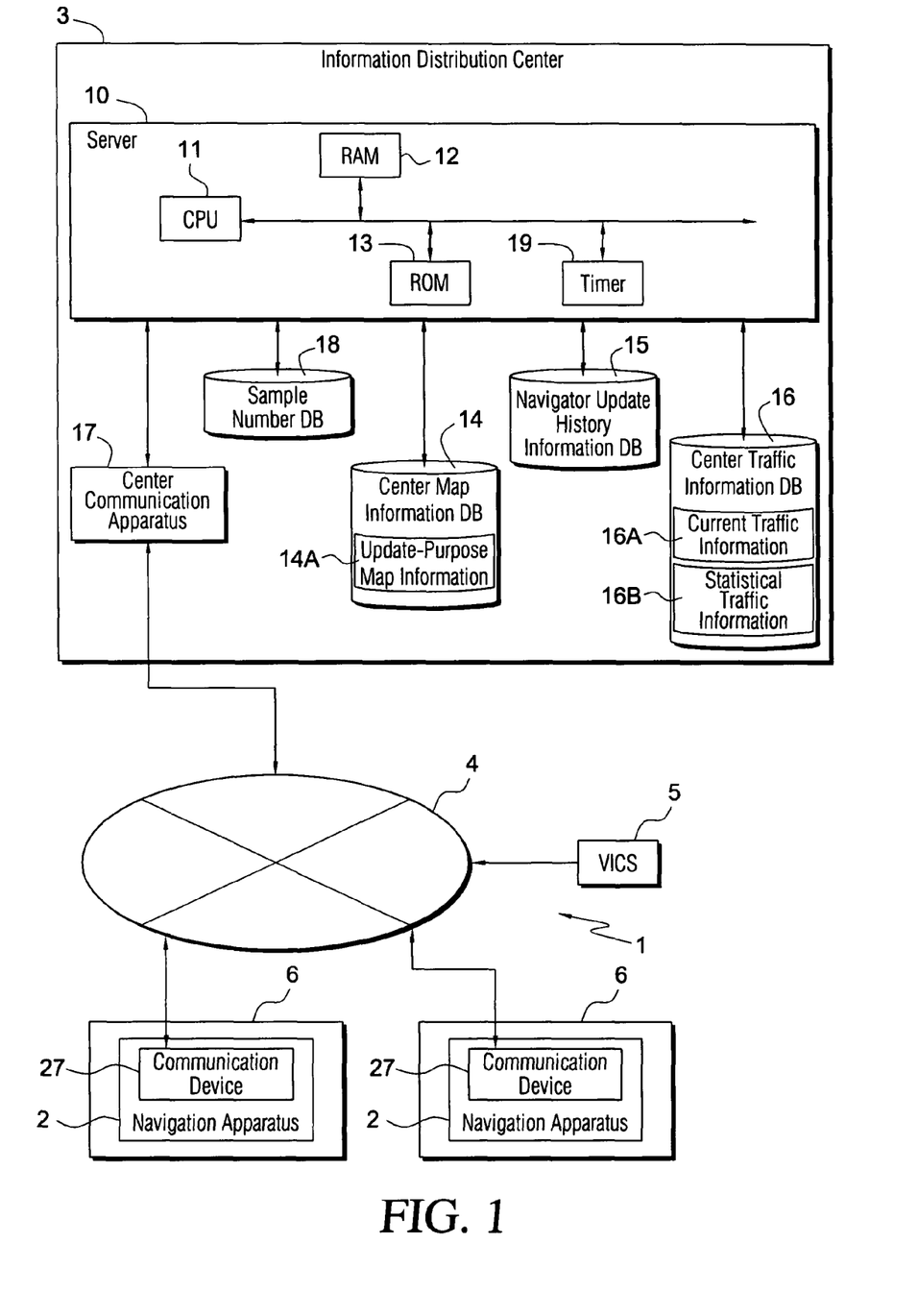
FIG. 1 is a block diagram of a navigation system according to an embodiment of the present invention.

As shown in FIG. 1, the navigation system 1 according to a preferred embodiment of the present embodiment basically includes: navigation apparatuses 2, each of which is installed in a different one of probe cars 6; an information distribution center 3 that distributes, to the navigation apparatuses 2, update information used for updating map information, as well as traffic information including congestion information that is generated based on probe information collected from the navigation apparatuses 2; and a network 4. The navigation apparatuses 2 and the information distribution center 3 transmit and receive various types of information to and from each other, via the network 4.

The Vehicle Information and Communication System (VICS: a registered trademark) 5 is connected to the network 4. The navigation apparatuses 2 and the information distribution center 3 are able to receive, once every predetermined period of time via the network 4, traffic information including information related to congestion of roads and traffic control information generated by collecting information from traffic control systems of the police, the Japan Highway Public Corporation and the like. The traffic information includes, for example, road congestion information related to congestion of roads and traffic control information pertaining to road construction and building construction. The road congestion information includes: a VICS link ID (explained later); the actual length of the congestion, the time required to drive through the congestion; the level of congestion (e.g., no congestion/crowded/congested); the speed of the vehicles in the congested area; the travel time; the traveling direction in the congested lane(s); and the time at which the congestion is expected to clear. The traffic control information includes: a VICS link ID (explained later); the period of predicted duration of road construction or building construction; the type of traffic control indicating that, for example, the road is closed, one lane is alternately shared by two-way traffic, or the number of lanes available is reduced; and the time period during which the traffic control will apply.

As shown in FIG. 1, the information distribution center 3 includes: a server 10; a center map information database (hereinafter, "center map information DB") 14 that is connected to the server 10 and serves as a map information recording unit; a navigator update history information database (hereinafter, "navigator update history information DB") 15; a center traffic information database (hereinafter, "center traffic information DB") 16; a center communicating apparatus 17; and a sample collection number database (hereinafter "sample number DB") 18. The server 10 includes: a CPU 11 that serves as a computing and controlling device that performs the overall control of the server 10; internal storage devices such as a RAM 12 that is used as a working memory when the CPU 11 executes various types of computation routines and a ROM 13; and a timer 19 that measures time. It is acceptable to use a MPU instead of the CPU 11. The ROM 13 has recorded therein various types of control programs including: a map information updating routine for, responsive to a request from any one of the navigation apparatuses 2, extracting update information from the center map information DB 14 and transmitting the extracted update information to the navigation apparatus 2 from which the request originated, so as to update that portion of map information corresponding to a predetermined area stored in the navigation apparatus 2; a traffic information generating routine (see FIG. 4) for generating current traffic information based on probe information collected from any one of the navigation apparatuses 2 installed in the probe cars 6; and a traffic information distributing routine for, responsive to a request from any one of the navigation apparatuses 2, distributing (transmitting) the current traffic information via the network 4. The probe information may include: the month, the day and the time, link information (e.g., a grid ID, a link ID, the link length, whether or not there are traffic lights, the type of the road etc.), the traffic conditions (e.g., the travel time, the level of congestion, the speed etc.), the location of the vehicle, grid ID of the secondary grid section in which the vehicle is located, the operating state of the windshield wipers, the vehicle exterior/road surface temperature, the weather, ABS (Antilock Brake System) operation information, the road surface conditions, and vehicle information (e.g., the type of vehicle, the performance specifications, the vehicle speed, the occupants, the distribution of weight of the vehicle, and how torque is applied).

The center map information DB 14 stores therein update map information 14A that is used when updating the map information that has been generated in the information distribution center 3 and stored in any of the navigation apparatuses 2, sets of update map information 14A being stored separated according to the version thereof. The center map information DB 14 also includes update information used for updating a part or the entirety of the map information currently stored in each of the navigation apparatuses 2 with the update map information 14A. Each such "version" includes generation time information identifying the time at which its map information was generated making it is possible to identify the time at which each set of map information was generated.

The various items of information required in order for each of the navigation apparatuses 2 to provide route guidance and display maps are included in the update map information 14A stored in the center map information DB 14. For example, the update map information 14A may include map display data used for displaying maps, intersection data describing intersections, node data related to node points, link data related to roads (i.e., road links, one type of "facility"), search data for searching for a route, shop data as Points of Interest (POI) (shops are treated as another type of "facility"), and retrieval data for retrieving location of a facility.

In particular, the map display data is divided into quarter units (by dividing the length into halves), sixteenth units (by further dividing the length into quarters), and units of sixty-fourth units (by dividing the length into eighths), all of which units are obtained by dividing the secondary grid sections each of which represents an area approximately 10 kilometers square. The units for different locations are set so that the amount of data is substantially the same for each of the units. The smallest unit, which has the size of one sixty-fourth of a secondary grid section, represents (covers) an area of approximately 1.25 square kilometers.

The node data includes: the actual branching points of the roads (including intersections and T-intersections); the coordinates (i.e., the locations) of the node points that are set spaced a predetermined distance in each of the roads (for every section), according to the radius of curvature thereof or the like; data indicating whether or not a node corresponds to an intersection; a connecting link number list, i.e. a list of link IDs used as identification numbers of the links that are connected to the nodes; an adjacent node number list, i.e. a list of the node numbers of the nodes that are located adjacent each node via links; and the altitude of the node points.

Data for the road links includes the width of the road to which the link belongs, the inclination, the cant, the bank, the road surface conditions, the number of lanes of the road, the locations at which the number of lanes is reduced, the locations at which the road narrows, and railroad crossings. The link data further includes data for corners, data for the radius of curvature, data for intersections, T-intersections, the entrance and the exit of the corners; road attribute data including data indicating downhill and uphill; data indicating the type of the road, e.g. national (federal) interstate, major local road, state road, city road, and small street in a downtown area that is narrower than a general road, as well as data indicating a toll road such as a federal interstate expressway, an urban expressway, an ordinary toll road or toll bridge. The data for toll roads further includes data related to ramps at the entrance and the exit of each toll road and toll booths (i.e., interchanges).

The search data used to search for a route to a specified destination includes cost data that is used for calculating a weight (hereinafter, referred to as a "cost") for each of the nodes that is determined based on a right/left turn to be made at the node, the length of the links that constitute the road, the width of the road, and the type of the road, as well as route display data used for displaying the route selected by the route search routine, superimposed on a map displayed on a liquid crystal display 25 (see FIG. 2) included in each of the navigation apparatuses 2.

Data for the POIs in each area (section), such as hotels, hospitals, gas stations, parking lots, and sightseeing locations is recorded with IDs that identify the respective POIs. The center map information DB 14 also has stored therein audio output data for outputting predetermined information through a speaker 26 (see FIG. 2) that is included in each of the navigation apparatuses 2.

Responsive to a request made by any one of the navigation apparatuses 2, the information distribution center 3 updates the map information stored in the navigation apparatus 2 with the newest (latest) version of update map information 14A stored in the center map information DB 14. More specifically, in the navigation system 1 according to the present embodiment, when any one of the navigation apparatuses 2 requests a specific item of update map information 14A, e.g. for a given area, update information for updating the stored map information with the requested item of update map information 14A, which is the newest version, is transmitted to the navigation apparatus 2, so that an updating routine can be executed. In transmitting the update information to the navigation apparatus 2, the entire newest version of update map information 14A, that includes new road information for identifying newly-built roads may be transmitted. Alternatively, the minimum necessary information (e.g., only that portion of the newest information 14A including the new road information for identifying the newly-built roads) need be transmitted for updating the map information currently stored in the navigation apparatus 2.

The navigator update history information DB 15 stores information for the update history which information identifies the updates that have so far been transmitted to the navigation apparatuses 2, together with navigator identification IDs of each of navigation apparatuses 2 to which the updates have been transmitted. The update history identifies the version of map information currently used for the data for each link and node, which data constitutes the map information.

Each time the map information stored in a navigation apparatus 2 is updated, the update history is re-written with new data.

The center traffic information DB 16 contains stored therein current traffic information 16A including information indicative of current road congestion and the like, generated from the probe information collected from the navigation apparatuses 2 in the probe cars 6 and traffic information received from the Vehicle Information Communication System (VICS: a registered trademark) 5. The probe information may include: the month, the day and the time of day, link information (e.g., a grid ID, a link ID, the link length, whether or not there are traffic lights in the link or on the road in which the link is located, and the type of road), the traffic conditions (e.g., the travel time, the level of congestion, and speed etc.), the location of the vehicle, a grid ID for the secondary grid section in which the vehicle is currently located, the operating state of the windshield wipers, the vehicle exterior/road surface temperature, the weather, ABS (Antilock Brake System) operation information, the road surface conditions, and the vehicle information (e.g., the type of the vehicle, the performance specifications, the vehicle speed, the occupants, the distribution of the weight of the vehicle, and how torque is applied). The center traffic information DB 16 also contains stored therein statistical traffic information 16B that has been generated based on the past traffic information, including VICS transmissions received from the Vehicle Information Communication System (VICS: a registered trademark) 5 and the probe information collected from the probe cars 6.

The statistical traffic information 16B may include event schedule information such as locations, dates, and times of events including festivals, parades, and firework shows. The statistical traffic information 16B may also include statistical congestion information or congestion prediction information indicating, for example, that the roads near a station or a large shopping mall are congested every day during a specific time of the day, except on the weekends, or that the roads near a beach are congested during summer holidays.

Responsive to a request from any one of the navigation apparatuses 2, the information distribution center 3 selects and distributes information on traffic between intersections, statistical traffic information 16B or the like, based on the current traffic information 16A stored in the center traffic information DB 16.

The traffic information received from the Vehicle Information and Communication System (VICS: a registered trademark) 5 includes a VICS link ID as well as the road type information, and information related to the location and length of the congested section, and the level of congestion. The VICS link ID is an identification number that is assigned to each VICS link serving as a driving guidance link standardized by dividing the road into sections at predetermined intersections. The traffic information also includes information related to the coordinates of the starting point and the ending point of each of the VICS links and also distance between the starting point and the ending point.

The road links and the VICS links that are stored in the center map information DB 14 are not the same. Generally speaking, road links are shorter than VICS links. Thus, a conversion table (reference table) for converting between road link IDs and VICS link IDs is provided, the road link IDs being assigned to the road links, respectively, as identification numbers. By referring to the conversion table, it is possible to identify, based on a VICS link ID, a road link ID that corresponds to the VICS link ID. With such a conversion table, it is possible to transmit the traffic information after converting the VICS link IDs to the road link IDs that are used in the navigation apparatuses 2.

As explained later, when generating the current traffic information based on the probe information collected from the navigation apparatuses 2 in the probe cars 6, the information distribution center 3 determines a sample collection number indicating how many samples are required, based on sample number data 51 (see FIG. 3) stored in the sample number DB 18.

Figure 3:
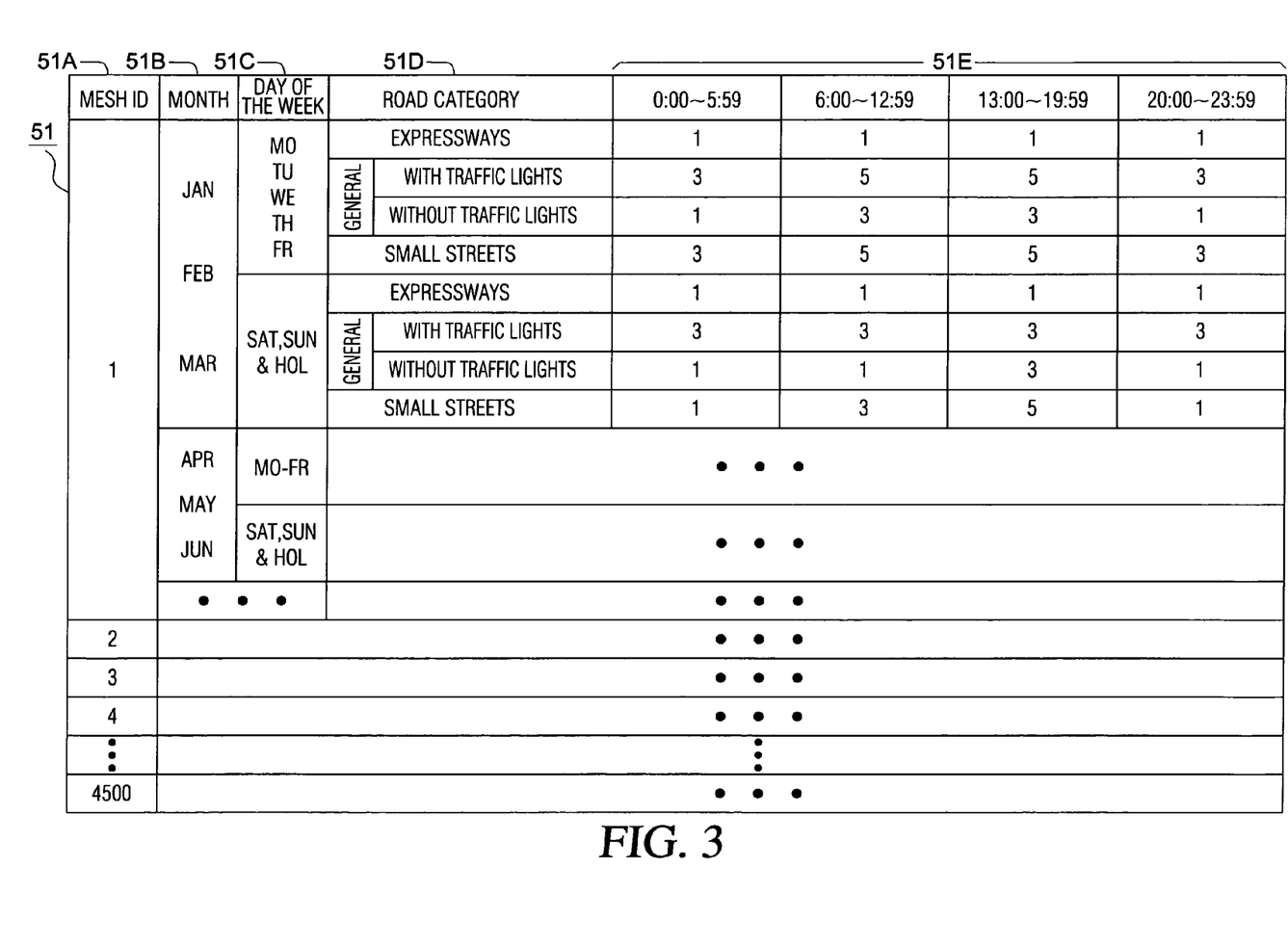
FIG. 3 is a table illustrating data structure of sample collection number data.

As shown in FIG. 3, in the sample number data 51, the following elements are specified: grid section IDs 51A serving as identification codes (IDs) respectively assigned to the aforementioned secondary grid sections (areas); the months 51B; the days of the week 51C, sample collection numbers 51E specified for each of the road categories 51D and indicating the number of samples of the probe information required to generate the traffic information for the correlated link.

The data for the months 51B is subordinate to the grid IDs 51A. With regard to the months 51B, sample numbers 51E are respectively given for each of the seasons such as "January to March", "April to June", "July to September", and "October to December". The data for the days of the week 51C is subordinate to the months 51B. With regard to the days of the week 51C, sample collection numbers 51E are shown for "Monday through Friday" denoting weekdays and for "Saturday, Sunday, and Holidays" denoting non-business days.

The data for the road categories 51D is subordinate to the days of the week 5C. With regard to the road categories 51D, sample collection numbers 51E are respectively given for interstate (federal or national) "EXPRESSWAYS", urban expressways, and ordinary toll roads "GENERAL" represents national roads, major local roads, state roads, and general roads of cities, towns, and villages, while "SMALL STREETS" refers to streets in downtown areas etc. that are narrower than the general roads. Further, within the "GENERAL" category of roads, sample collection numbers 51E are given for the sub-categories "WITH TRAFFIC LIGHTS" representing roads having traffic lights and "WITHOUT TRAFFIC LIGHTS" representing roads having no traffic lights.

The sample collection number data 51E is stored in correlation with each of the grid sections (area subdivisions). The sample collection number data 5E is data that indicates the number of samples required in order to generate the traffic information of each of the grid sections, in correspondence with each of the time periods of the day, namely, "0:00-5:59", "6:00-12:59", "13:00-19:59", and "20:00-23:59". Such data is stored for twenty-four hours. More specifically, the sample collection number data 51E is data in which factors related to the grid IDs 51A (the locality), the months 51B, the days of the week 51C, the road categories 51D, and the time periods are taken into account.

For example, when the grid ID 51A is "1", the month 51B is "January", the day of the week 51C is "Monday", the road category 51D is "EXPRESSWAY", and the time period is "6:00-12:59", the sample collection number 51E is "1", which means that the number of samples of probe information required to generate the traffic information for a national expressway, an urban expressway, or the like is at least "1".

As another example, when the grid ID 51A is "1", the month 51B is "February", the day of the week 51C is "Wednesday", the road category 51D is "GENERAL: WITH TRAFFIC LIGHTS", and the time period is "6:00-12:59", the sample collection number 51E is "5", which means that the number of samples of probe information required in order to generate the traffic information for a national road, a major local road, a prefectural (state) road, or a city, town, or village road that has traffic lights is at least "5".

As yet another example, when the grid ID 51A is "1", the month 51B is "March", the day of the week 5C is "Sunday", the road category 51D is "SMALL STREETS", and the time period is "6:00-12:59", the sample collection number 51E is "3", which means that the number of samples of probe information required to generate the traffic information for a small street in a downtown area or the like (narrower than a general road) is at least "3".

The information distribution center 3 may be operated by an individual, a corporation, an organization, a local government, or a government-related organization. Also, the information distribution center 3 may be part of the Vehicle Information Communication System (VICS: a registered trademark) 5.

The network 4 may be any communication network such as, for example, a LAN (Local Area Network), a WAN (Wide Area Network), an Intranet, a mobile phone network, a telephone network, a public communication network, a dedicated communication network, or the Internet. It is also possible to use CS broadcast systems operated with broadcast satellites, BS broadcast, terrestrial digital television broadcast, or FM multiplex broadcast systems. Further, it is also possible to use a communication system such as an Intelligent Transport System (ITS), e.g. an Electronic Toll Collection (ETC) system or a Dedicated Short Range Communication (DSRC) system.

Figure 2:
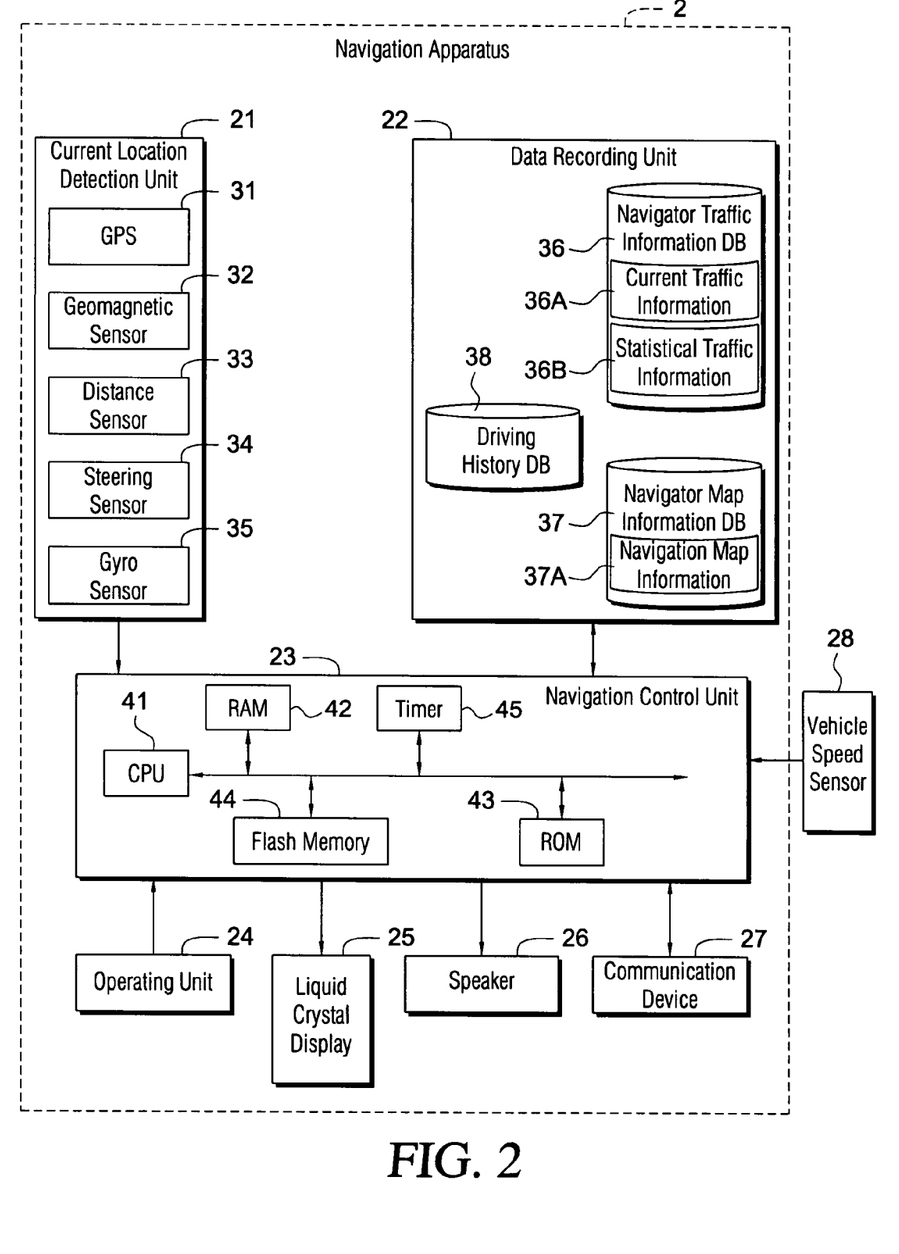
FIG. 2 is a block diagram of a vehicle navigation apparatus included in the navigation system of FIG. 1.

The configuration of each navigation apparatus 2 is shown in FIG. 2 as including a current location detection unit 21 that detects the current location of the vehicle; a data recording unit 22 that contains recorded therein various types of data; a navigation control unit 23 that executes various computation routines based on input information; an operating unit 24 that receives input from an operator; a liquid crystal display 25 that displays information such as maps; a speaker 26 that outputs audio route guidance; and a communication device 27 that communicates with the Vehicle Information and Communication System (VICS: a registered trademark) 5, the information distribution center 3, or the like via, for example, a mobile phone network. A vehicle speed sensor 28 that detects the driving speed of the vehicle is also connected for input to the navigation control unit 23.

Next, the components of the navigation apparatus 2 will be explained. The current location detection unit 21 includes a GPS 31, a geomagnetic sensor 32, a distance sensor 33, a steering sensor 34, a gyro sensor 35 that serves as a direction detecting unit, and an altimeter (not shown in the drawing). The current location detection unit 21 is able to determine the current location of the vehicle, the direction in which the vehicle is oriented, the distance to a target location (for example, an intersection), and the like.

More specifically, the GPS 31 detects the current location of the vehicle and the current time by receiving a radio signal from an artificial satellite. The geomagnetic sensor 32 detects the direction in which the vehicle is oriented by measuring the terrestrial magnetism. The distance sensor 33 may be a sensor that measures the rotation speed of the wheels (not shown in the drawing) of the vehicle and detects distance based on the measured rotational speed, or a sensor that measures acceleration and detects distance by integrating the measured acceleration twice.

The steering sensor 34 detects the steering angle of the vehicle. The steering sensor 34 may be, for example, an optical rotation sensor that is attached to a rotatable portion of the steering wheel mechanism (not shown in the drawing), a potentiometer, or an angle sensor attached to a wheel.

The gyro sensor 35 detects the turning angle of the vehicle and may be, for example, a gas ratio gyro, a vibration gyro, or the like. By integrating the turning angle detected by the gyro sensor 35, it is possible to detect the direction in which the vehicle is oriented.

The data recording unit 22 includes: a hard drive (disk, not shown in the drawing) that serves as an external storage device and storage medium; databases that are stored on the hard drive, including a navigator traffic information database (hereinafter, "navigator-side traffic information DB") 36, a navigator map information database (hereinafter, "navigator map information DB") 37, and a driving history database (hereinafter, "driving history DB") 38; and a recording head (not shown in the drawing) that serves as a driver to read a selected program and the like and also to write data onto the hard drive. In the present embodiment, the hard drive is used as the external storage device and storage medium included in the data recording unit 22; however, instead of the hard drive, a magnetic disc such as a flexible ("floppy") disc may be used as the external storage device. Alternatively, the external storage device may be a memory card, a magnetic tape, a magnetic drum, a CD, an MD, a DVD, an optical disc, an MO, an IC card, an optical card, or the like.

The navigator traffic information DB 36 contains stored therein, current traffic information 36A generated based on traffic information received from the information distribution center 3 or the Vehicle Information and Communication System (VICS) 5, the traffic information including road congestion information related to the current congestion conditions on the roads, such as the actual length of the congestion, the required travel time, the cause of the congestion, and the time at which the congestion is predicted to clear, as well as traffic controls in place due to road construction, building construction, and the like. Statistical traffic information 36B stored in the navigator traffic information DB 36 includes the aforementioned statistical traffic information 16B that has been transmitted from the information distribution center 3 via the communication device 27. The contents of the statistical traffic information 16B included in the statistical traffic information 36B are updated by downloading the update information that has been transmitted from the information distribution center 3 via the communication device 27.

The aforementioned statistical traffic information 16B is supplied to each of the navigation apparatuses 2 on a CD-ROM or the like and is stored in the statistical traffic information 36B, so that the statistical traffic information 36B is updated based on a driving history, at the end of each period of time of a predetermined duration (for example, once a week or once every three months).

The statistical traffic information 36B may also include event schedule information such as locations, dates, and times of events including festivals, parades, and firework shows. In addition, the statistical traffic information 36B may also include statistical congestion information or congestion prediction information indicating, for example, that the roads near a transportation station or a large shopping mall are congested every day during a specific time of the day, except on the weekends, or that the roads near a beach are congested during summer holidays.

The navigator map information DB 37 contains stored therein navigational map information 37A that is used in providing driving guidance and in route searching by the navigation apparatuses 2 and is also updated with information received from the information distribution center 3. Like the update map information 14A, the navigation map information 37A includes various types of information required in order to provide route guidance and to display maps. The navigation map information 37A includes, for example, new road information for identifying newly-built roads, map display data for displaying maps, intersection data related to intersections, node data related to node points, link data related to roads (i.e., links, one type of "facility"), search data for searching for a route, shop data related to Points of Interest (POI) such as shops (another type of "facility"), and retrieval data for retrieving a POI. The details of these various types of data have already been explained above and a detailed explanation thereof is omitted here. The contents of the navigator map information DB 37 are updated by downloading the update information that has been transmitted from the information distribution center 3 via the communication device 27.

Each time a vehicle traverses a link, the driving history DB 38 sequentially stores therein a piece of probe information. Examples of the probe information include: the month, the day and the time, link information (e.g., a grid ID, a link ID, the link length, whether or not there are traffic lights, the type of the road, etc.), the traffic conditions (e.g., the travel time, the level of congestion, the speed etc.), the location of the vehicle, a grid ID for the secondary grid section in which the vehicle is located, the operating state of the windshield wipers, the vehicle exterior/road surface temperature, the weather, ABS (Antilock Brake System) operation information, the road surface conditions, and the vehicle information (e.g., the type of the vehicle, the performance specifications, the vehicle speed, the occupants, the distribution of the weight of the vehicle, and how torque is generated). Each of the navigation apparatuses 2 installed in the probe cars 6 transmits, to the information distribution center 3 via the communication device 27, one or more pieces of probe information that have newly been stored in the driving history DB 38 since the immediately-preceding transmission point in time at which a piece of probe information was previously transmitted to the information distribution center 3, once every predetermined period of time (e.g., once every 5 minutes, once every 15 minutes, or once every 30 minutes) as the probe car 6 is being driven, or every time the vehicle traverses a link.

Also, as shown in FIG. 2, the navigation control unit 23 included in each of the navigation apparatuses 2 includes: a CPU 41 that serves as a computing and control device for overall control of the navigation apparatus 2; internal storage devices such as a RAM 42 that is used as a working memory when the CPU 41 executes various computation routines and that stores therein, for example, route data after a route has been found in a search and the traffic information received from the information distribution center 3, a ROM 43 that contains stored therein, a control program as well as a probe information transmission processing program used for obtaining the probe information and transmitting, once every predetermined period of time, the obtained probe information to the information distribution center 3, and a flash memory 44 that stores therein a program that has been read from the ROM 43; as well as a timer 45 that measures time. The RAM 42, the ROM 43, and the flash memory 44 may each be a semiconductor memory, a magnetic core, or the like. The computing and control device may be a MPU or the like, instead of the CPU 41.

According to the present embodiment, various types of programs are stored in the ROM 43, and also various types of data are stored in the data recording unit 22; however, it is also acceptable to have the programs and the data stored in the same external storage device, such as a memory card, and written into the flash memory 44. Further, by replacing the memory card or the like, it is possible to update both the programs and the data.

Further, peripheral devices (actuators) for the operating unit 24, the liquid crystal display 25, the speaker 26, and the communication device 27 are electrically connected to the navigation control unit 23.

The operating unit 24 is operated, for example, when a starting point that serves as a guidance starting location and a destination that serves as a guidance terminal location are input by correcting the current location indicated when the vehicle starts travel or when information related to facilities is retrieved. The operating unit 24 includes various types of keys and a plurality of operation switches. Responsive to switch signals that are output when the switches, etc. are operated, the navigation control unit 23 executes a corresponding operation. The operating unit 24 may be a keyboard, a mouse, a barcode reader, a remote control device for remote-control operations; a joy stick, a light pen, a stylus pen, or the like. Further, the operating unit 24 may be a touch panel provided on the front surface of the liquid crystal display 25.

The liquid crystal display 25 serves to display a route guidance screen on which a map based on the navigation map information 37A is displayed along with traffic information for each of the links. The liquid crystal display 25 is also operable to display screens showing operation guidance, guidance related to menus and keys, route guidance from a current location to a destination, guidance along the selected route, traffic information, news, weather forecasts, the time, electronic mail, TV programs, and the like. Instead of the liquid crystal display 25, a CRT display, a plasma display, or the like may be used. It is also possible to use a hologram device that projects a hologram image onto the windshield of the vehicle.

According to a command signal from the navigation control unit 23, the speaker 26 outputs, for example, audio guidance for guiding the vehicle along the selected (search) route. Such audio guidance might be, for example, "Go 200 meters and turn right at intersection X", or "National Route No. X ahead is congested." The audio output from the speaker 26 may be a synthesized voice, various sound effects, or various items of other guidance information that have been recorded in advance on a tape or in a memory.

The communication device 27 provides communication with the information distribution center 3 via a mobile phone network, or the like. The communication device 27 transmits and receives items of update map information, i.e. the newest version, as well as the current traffic information to and from the information distribution center 3. In addition, the communication device 27 receives, not only information from the information distribution center 3, but also traffic information, transmitted from the Vehicle Information Communication System (VICS) 5, including congestion information, traffic control information, parking lot information, traffic accident information, and information about crowding in service areas.

Next, a traffic information generating routine, that is executed by the CPU 11 included in the information distribution center 3 to generate current traffic information based on the probe information collected from the probe cars 6, will be explained, with reference to FIG. 4.

Figure 4:
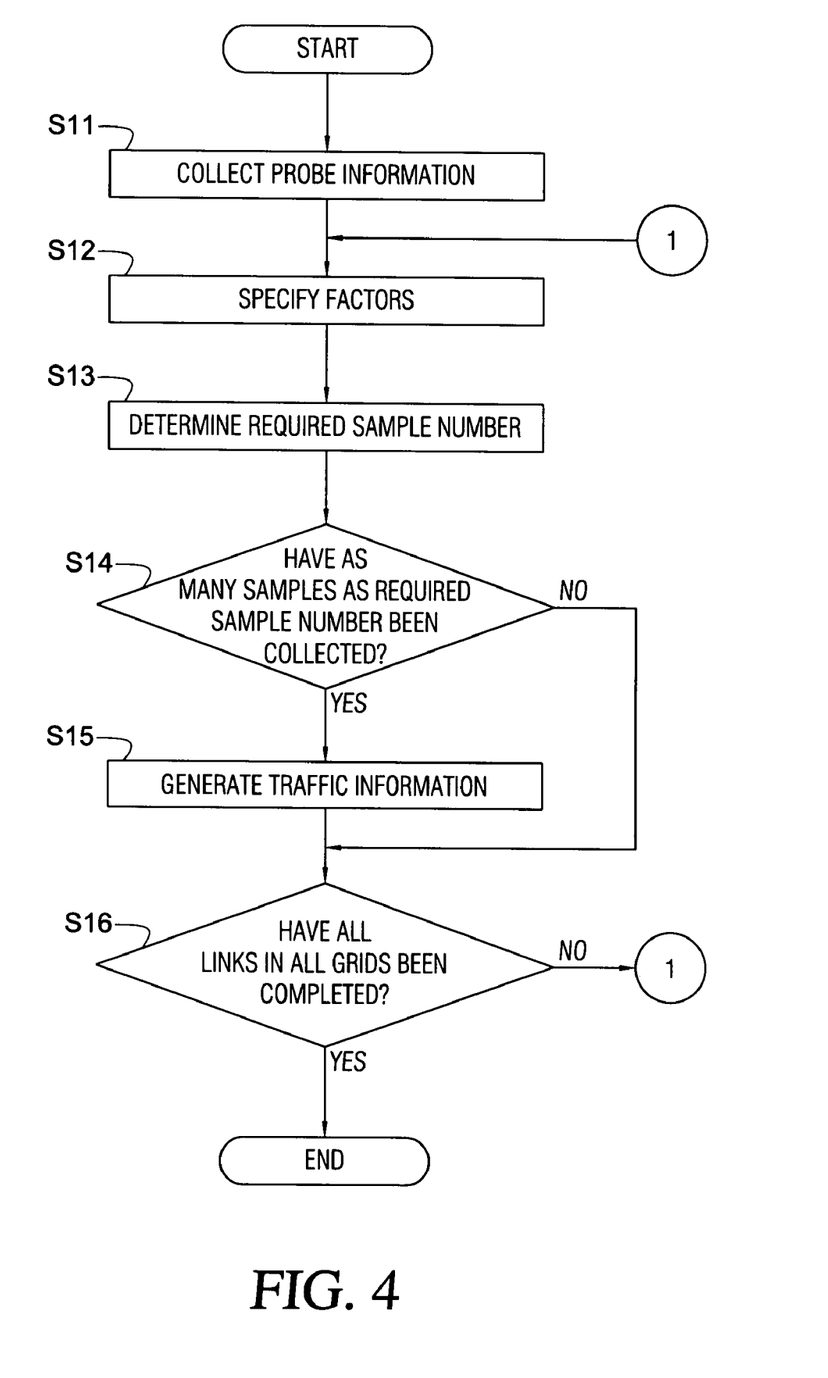
FIG. 4 is a flowchart of a traffic information generating routine executed by a CPU in an information distribution center for generating current traffic information based on probe information collected from the vehicle navigation apparatus.

The program illustrated in the flowchart in FIG. 4 is stored in the RAM 12 or the ROM 13 included in the information distribution center 3 and is executed by the CPU 11 each predetermined period of time (for example, once every 0.1 seconds or once every minute).

As shown in FIG. 4, at first, in step S11, the CPU 11 receives probe information transmitted from the navigation apparatuses 2 installed in the probe cars 6 via the center communication apparatus 17 and sequentially stores the received items of probe information in the center traffic information DB 16. The CPU 11 thereby serves as a "probe information collecting unit."

Next, at S12, the CPU 11 reads time data from the timer 19 and thereby obtains the current date and time. The CPU 11 specifies factors related to the month 51B, the day of the week 51C, and time period of the current point in time and stores the specified factors in the RAM 12.

Subsequently, at S13, based on the map display data and the link data that are stored in the update map information 14A, the CPU 11 reads link data for a first link within a secondary grid section with ID "1". The CPU 11 specifies factors related to the grid ID 51A and the road category 51D of the link. Subsequently, the CPU 11 reads a sample collection number 51E corresponding to the first link from the sample number data 51 stored in the sample number DB 18, based on the factors related to the month 51B, the day of the week 51C, and the time period of the current point in time that have been specified at S12 and the factors related to the grid ID 51A and the road category 51D for the first link. The CPU 11 then stores the corresponding sample collection number 51E in the RAM 12. More specifically, the CPU 11 reads the sample collection number 51E that corresponds to the first link (grid ID 51A "1") and determines how many samples of the probe information are required in order to generate the traffic information for the first link. A link ID indicating location in sequence is assigned to the links contained in each of the secondary grid sections.

For example, in correspondence with a current point in time, when the month 51B is "February", the day of the week 51C is "Wednesday", the time is within the period "13:00-19:59", if the road category 51D for the first link (grid ID 51A "1") is "EXPRESSWAY" that corresponds to an urban expressway, "1" is read as the sample collection number 5E from the sample number data 51. Thus, the number of samples of the probe information that are required in order to generate the traffic information for the first link is determined to be at least "1".

At S14, the CPU 11 judges whether or not the center traffic information DB 16 contains stored therein a number of samples at least equal to the sample collection number of the first link that has been determined at S13 and that indicates the number of samples required to generate the traffic information for the first link. The CPU II thereby serves as a "sample number judging unit" 112.

The probe information may include: the month, the day and the time, link information (e.g., grid ID, link ID, link length, the presence of traffic lights, type of road, etc.), the traffic conditions (e.g., travel time, level of congestion, speed etc.), the location of the vehicle, grid ID of the secondary grid section in which the vehicle is located, operating state of the windshield wipers, vehicle exterior/road surface temperature, weather, ABS (Antilock Brake System) operation information, road surface conditions, and vehicle information (e.g., the type of vehicle, performance specifications, vehicle speed, occupants, distribution of the weight of the vehicle, and how torque is generated). Accordingly, by sequentially obtaining items of link information, it is possible to obtain the sample collection number for the probe information correlated with the first link.

When the center traffic information DB 16 has accumulated, stored therein, a number of samples of probe information equal to or greater than the required sample collection number that has been determined at S13, i.e. the number of samples required to generate traffic information for the first link (S14: YES), the CPU II proceeds to S15. At S15, the CPU 11 reads all of the samples of probe information (items of information collected from probe cars) that correspond to the first link having "1" as the grid ID 51A and, based on the read number of samples of probe information, the CPU 11 generates current traffic information (e.g., congestion information indicating the level of congestion, link travel time, etc.) for the first link. The CPU II thereby serves as a "control unit" 113 for controlling the generation of the traffic information. The CPU II then stores the generated current traffic information as part of the current traffic information 16A in correlation with the link ID of the first link. The CPU 11 then proceeds to S16.

On the other hand, when the center traffic information DB 16 contains less samples of probe information than the sample collection number assigned to the first link (grid ID 51A "1"), (S14: NO), execution of the routine proceeds to S16.

At S16, the CPU 11 judges whether or not steps S12 through S15 have been performed for all of the links in all of the secondary grid sections. If steps S12 through S15 have not been performed for all of the links in all of the secondary grid sections (S16: NO), the execution returns to S12 and continues processing for the next link ID in the grid section having the grid ID 51A. Also, if the CPU 11 has already executed steps S12 through S15 for the link with the last link ID contained in a grid ID 51A, the CPU 11 sequentially executes steps S12 through S15 for each of the links that are contained in the grid section having the next grid ID 51A.

On the other hand, when the CPU 11 has already executed steps (subroutines) S12 through S15 for all of the links in all of the secondary grid sections (S16: YES), the CPU 11 ends the program.

As explained above, in the present embodiment, sample number data 51 is stored, in advance, in the sample number DB 18 for each of plural time periods such as "0:00-5:59"-"20:00-23:59", in correlation with each of the factors related to the grid IDs 51A, the months 51B, the days of the week 51C, and the road categories 51D. The CPU II in the information distribution center 3 collects the pieces of probe information from the navigation apparatuses 2 installed in the probe cars 6 and stores the collected pieces of probe information in the center traffic information DB 16 (S11). Subsequently, the CPU 11 specifies factors that are related to the month 51B, the day of the week 51C, and the time period in which the current point in time falls, based on the time obtained by the timer 19 or the like. The CPU 11 also specifies the factors that are related to the grid ID 51A and the road category 51D of each one of the links, based on the map display data, the link data, and the like that are stored in the update map information 14A. The CPU 11 then reads the sample collection number 51E indicating the number of samples required to generate the traffic information for one of the links, out of the sample number data 51. The CPU 11 thereby sequentially determines the sample collection numbers for different links (S12-S13). Subsequently, when the center traffic information DB 16 contains, for a given link, a number of pieces of probe information equal to or greater than the sample collection number indicating the required number of samples, the CPU 11 generates the traffic information for that link and stores the generated traffic information as part of the current traffic information 16A (S14-S16).

Utilizing the process described above, it is possible to set, in advance, the sample collection numbers 51E, which are included in the sample number data 51, in such a manner that the sample collection numbers 51E change in correspondence with the factors related to the grid Ds 51A, the months 51B, the days of the week 51C, and the road categories 51D. In other words, it is possible to set the sample collection numbers 51E, in advance, in such a manner that the sample collection numbers 51E change in correspondence with the levels of reliability of the probe information. Thus, the CPU 11 is able to generate traffic information with an even higher level of accuracy with a smaller number of samples of probe information, according to the sample collection numbers 51E that have been set in advance, in correspondence with the levels of reliability of the probe information.

The road categories 51D include "EXPRESSWAYS", "WITH TRAFFIC LIGHTS" denoting general roads having traffic lights, and "WITHOUT TRAFFIC LIGHTS" denoting general roads having no traffic lights, as well as "SMALL STREETS". Thus, because the level of reliability of the probe information for "EXPRESSWAYS" such as a national (federal) expressway having no traffic lights is high, it is possible to generate traffic information for a link with a high level of accuracy, even though using a minimum number of samples of probe information (for example, even if the sample collection number is 1). In addition, it is possible to make the level of accuracy of the traffic information higher by setting the sample collection number for general roads having traffic lights, as a larger number while setting the sample collection number for general roads having no traffic lights as a smaller number (for example, by setting the sample collection number to 1).

A grid ID 51A is assigned to each of the secondary grid sections. Thus, it is possible to set the sample collection numbers in such a manner that the sample collection numbers change in accordance with the secondary grid section in which the vehicle is currently located. Consequently, the CPU 11 is able to generate traffic information that has a higher level of accuracy for each of the links, even with a smaller number of samples of probe information collected from the probe cars 6.

Further, the sample collection numbers may be set in correspondence with the months 51B and the days of the week 51C. Thus, it is possible to set the sample collection numbers in such a manner that the sample collection numbers change in correspondence with the factors related to the time of the year and the day of the week. Consequently, the CPU 11 is able to generate traffic information that has an even higher level of accuracy for each of the links, even with a smaller number of samples of probe information collected from the probe cars 6.

The present invention is not limited to the embodiment described above. Needless to say, it is possible to provide various improvements and modifications to the present invention within a scope that does not depart from the gist of the present invention.

Figure 5:
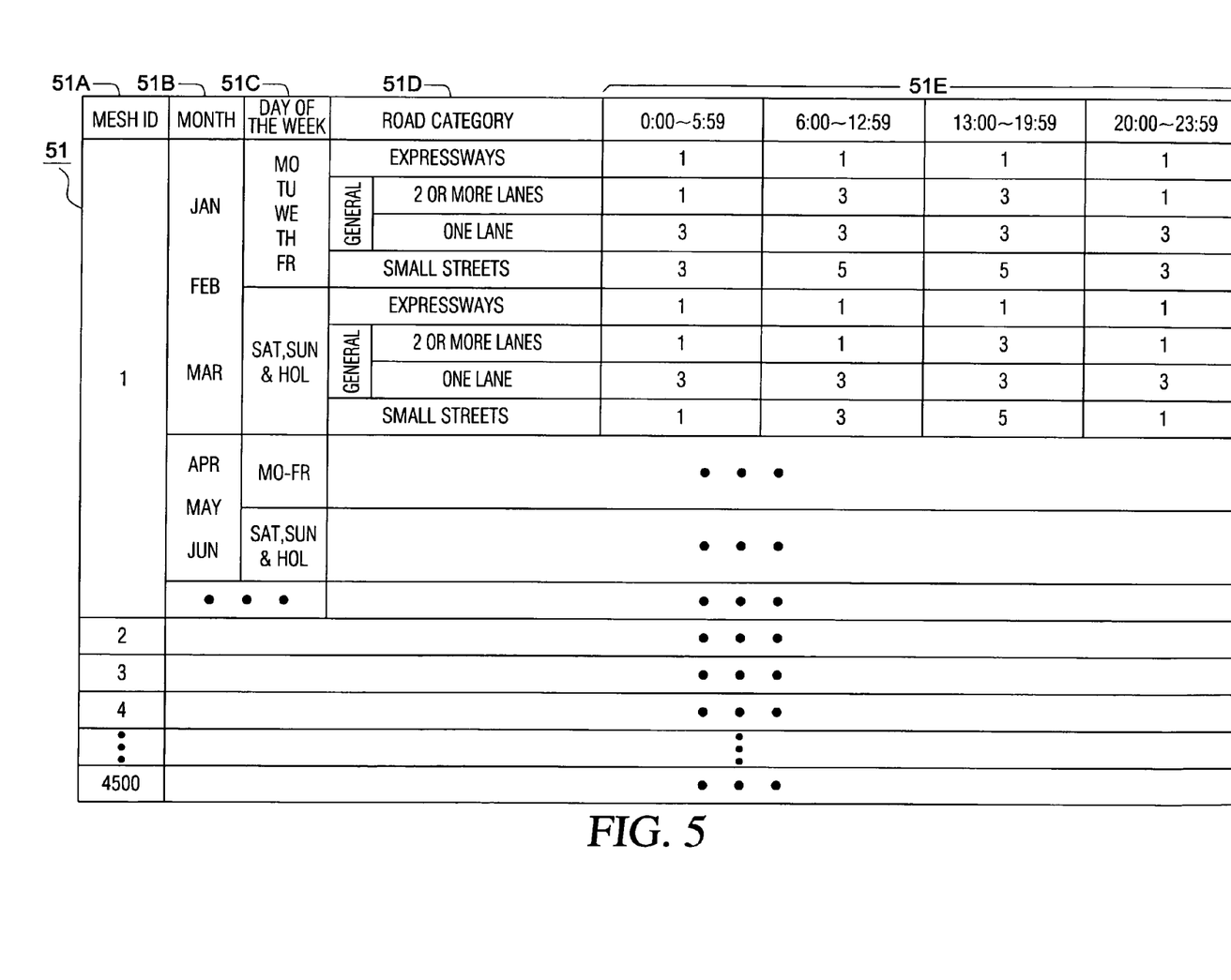
FIG. 5 is a table illustrating data structure of sample collection number data, according to another embodiment of the present invention.

(1) For example, as shown in FIG. 5, within the road categories 51D included in the sample number data 51, it is acceptable to divide "GENERAL", denoting general roads, into "TWO OR MORE LANES", denoting general roads having two or more lanes, and "ONE LANE" denoting general roads having one lane. In this manner, it is possible to raise the level of accuracy of the traffic information, by setting the sample collection number for probe information to a larger number for those general roads having one lane and to a smaller number for those general roads having two or more lanes (for example, by setting the sample collection number to 1).

(2) In the above-described embodiment, the traffic information is generated in the information distribution center 3 by collecting the probe information from the probe cars 6. However, the CPU 41 included in the navigation apparatus 2 installed in a vehicle may be used to collect the probe information from the navigation apparatuses 2 in the probe cars 6 in the vicinity of that vehicle, and to transmit the generated traffic information to the information distribution center 3. In this manner, it is possible to reduce the processing load of the information distribution center 3.

(3) In the above-described embodiment, the sample collection numbers 51E each indicate the number of samples required in correspondence with the factors related to the grid section IDs 51A, the month 51B, the day of the week 51C, and the road category 51D. However, sample collection numbers 51E may be set in such a manner that they change in accordance with the type of data of the probe information. For example, where the grid ID 51A is "1", the month 51B is "February", the day of the week 51C is "Monday through Friday", and the road category 51D is "EXPRESSWAY", the sample collection number 51E for an item of probe information corresponding to "the link travel time" is set to "2", whereas the sample collection number 51E for an item of probe information corresponding to "the level of congestion" is set to "3", while the sample collection number 51E for items of probe information corresponding to other types of data is set to "1". In this manner, it is possible to generate the traffic information with a higher level of accuracy in correspondence with the type of data, even with a smaller number of samples of probe information.

(4) The sample numbers 51E may also be set in such a manner that they change in correspondence with the types of the vehicle. For example, in a case where the grid ID 51A is "1", the month 51B is "February", the day of the week 51C is "Monday through Friday", and the road category 51D is "GENERAL: NO TRAFFIC LIGHTS", the sample collection number 51E corresponding to the time period "6:00-12:59" for regular automobiles may be set to "3", whereas the sample collection number 51E corresponding to the time period "6:00-12:59" for buses and taxis that stop often even when the roads are not congested is set to "6". In this manner, it is possible to generate traffic information with a higher level of accuracy, taking driving conditions corresponding to the type of the vehicle into consideration using a smaller number of samples of the probe information.

(5) The driving speed included in the probe information may vary greatly for each of the probe cars 6. Thus, the congestion information included in the traffic information may be obtained by temporarily converting the driving speed in a sample of probe information to a level of congestion (for example, when the vehicle speed is 20 km/h or higher, the level of congestion might be expressed as "no congestion"; when the vehicle speed is equal to or higher than 10 km/h and is lower than 20 km/h, the level of congestion expressed as "crowded"; and when the vehicle speed is lower than 10 km/h, the level of congestion expressed as "congested") and then averaging the levels of congestions to calculate a required travel time. In this manner also, it is possible to increase the level of accuracy.

(6) In another alternative, the sample number data 51 is set taking into account consecutive non-business days (e.g., a three-day weekend), event information, and the like. It is also possible to set the sample number data 51 in correspondence with each of administrative districts, such as urban and state, cities, wards, towns, and villages, instead of each of grid IDs 51A. Further, while in the embodiment described above, the sample collection numbers 51E are correlated with the road categories 51D divided as "EXPRESSWAYS", "GENERAL: WITH TRAFFIC LIGHTS", "GENERAL: WITHOUT TRAFFIC LIGHTS", and "SMALL STREETS". Alternatively, however, the sample collection numbers 51E may be set in correspondence with the individual roads (for example, the sample collection numbers 51E may be set in correspondence with "National Route 1", "National Route 2", . . . and "National Route X", respectively).

(7) In the embodiment described above, the sample collection numbers 51E are correlated with the road categories 51D such as "EXPRESSWAYS", "GENERAL: WITH TRAFFIC LIGHTS", "GENERAL: WITHOUT TRAFFIC LIGHTS", and "SMALL STREETS". Alternatively, however, the sample collection numbers 51E may be set in correspondence with link IDs that are the identification codes (IDs) assigned to the road links. Further, the sample collection numbers 51E may be set in correspondence with link IDs by dividing the link IDs into "WITH TRAFFIC LIGHTS" denoting links having traffic lights at their end points and "WITHOUT TRAFFIC LIGHTS" denoting links having no traffic lights at their end points. In this manner, it is possible to increase the level of accuracy of the traffic information of each of the links, by assigning higher sample collection numbers to the links that have traffic lights at their end points, to a larger number. In addition, it is also possible to generate traffic information with a higher level of accuracy by setting the sample collection number for the links that have no traffic lights at their end points than those assigned.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A traffic information generating apparatus comprising:
   a probe information collecting unit that collects probe information from at least one navigation apparatus;
   a sample number database that contains therein differing sample collection numbers respectively correlated with each of plural road categories, each sample collection number indicating the number of samples of the probe information required to generate traffic information for a link in a travel route;
   a sample number judging unit that judges whether or not the required number of samples of probe information has been collected, based on the sample collection number; and
   a control unit that, responsive to a judgment that the required number of samples of probe information has been collected, controls generation of the traffic information for the link; and
   wherein the road categories include a road with a traffic light and a road without a traffic light, and
   the sample collection number for the road without a traffic light is set to a smaller number than the sample collection number for a road with a traffic light.

2. The traffic information generating apparatus according to claim 1, wherein
   the sample number database contains, stored therein, a sample collection number for each of different plural areas, and
   the sample number judging unit judges whether or not the required number of samples of probe information has been collected, based on a sample collection number for one of the plural areas.

3. The traffic information generating apparatus according to claim 2, wherein
   the sample collection numbers, as stored in the sample number database, are further categorized in accordance with at least one of month, day of week, and a time period within a day.

4. The traffic information generating apparatus according to claim 2, wherein
   the sample collection numbers, as stored in the sample number database, are further categorized in correspondence with whether or not the link has a traffic light.

5. The traffic information generating apparatus according to claim 2, wherein
   the sample collection numbers, as stored in the sample number database, are further categorized in correspondence with the number of lanes in the link.

6. The traffic information generating apparatus according to claim 1, wherein
   the sample collection numbers, as stored in the sample number database, are further categorized in accordance with at least one of month, day of a week, and time period within a day.

7. The traffic information generating apparatus according to claim 6, wherein
   the sample collection numbers, as stored in the sample number database, are further categorized in correspondence with whether or not the link has a traffic light.

8. The traffic information generating apparatus according to claim 6, wherein the sample collection numbers, as stored in the sample number database, are further categorized in correspondence with the number of lanes in the link.

9. The traffic information generating apparatus according to claim 1, wherein
   the sample collection numbers, as stored in the sample number database, are further categorized in correspondence with whether or not the link has a traffic light.

10. The traffic information generating apparatus according to claim 1, wherein
    the sample collection numbers, as stored in the sample number database, are further categorized in correspondence with the number of lanes in the link.

11. A traffic information generating method comprising:
    collecting, by a processor, probe information from a navigation apparatus;
    judging, by the processor, whether or not a required number of samples of the probe information has been collected, based on one of sample collection numbers that are respectively correlated with each of different road categories, each sample collection number indicating a number of samples of the probe information required to generate, by the processor, traffic information for a link; and
    responsive to a judgment that the required number of samples of the probe information has been collected, generating the traffic information for the link; and
    wherein the road categories include a road with a traffic light and a road without a traffic light, and
    the sample collection number for the road without a traffic light is set to a smaller number than the sample collection number for a road with a traffic light.

12. The traffic information generating method according to claim 11 wherein
    the sample number database contains, stored therein, a sample collection number for each of different plural areas, and the sample number judging unit judges whether or not the required number of samples of probe information has been collected, based on a sample collection number for one of the plural areas.

13. The traffic information generating method according to claim 12 wherein
the sample collection numbers, as stored in the sample number database, are further categorized in accordance with at least one of month, day of week, and time period within a day.

14. The traffic information generating method according to claim 13 wherein
the sample collection numbers, as stored in the sample number database, are further categorized in correspondence with whether or not the link has a traffic light.

15. The traffic information generating method according to claim 12 wherein
the sample collection numbers, as stored in the sample number database, are further categorized in correspondence with whether or not the link has a traffic light.

16. The traffic information generating method according to claim 12 wherein
the sample collection numbers, as stored in the sample number database, are further categorized in correspondence with the number of lanes in the link.

17. The traffic information generating method according to claim 11 wherein
the sample collection numbers, as stored in the sample number database, are further categorized in accordance with at least one of month, day of week, and time period within a day.

18. The traffic information generating method according to claim 17 wherein
the sample collection numbers, as stored in the sample number database, are further categorized in correspondence with whether or not the link has a traffic light.

19. The traffic information generating method according to claim 11 wherein
the sample collection numbers, as stored in the sample number database, are further categorized in correspondence with whether or not the link has a traffic light.

20. The traffic information generating method according to claim 11 wherein
the sample collection numbers, as stored in the sample number database, are further categorized in correspondence with the number of lanes in the link.

21. A traffic information generating apparatus comprising:
a probe information collecting unit that collects probe information from at least one navigation apparatus;
a sample number database that contains therein differing sample collection numbers respectively correlated with each of plural road categories each, sample collection number indicating the number of samples of the probe information required to generate traffic information for a link in a travel route;
a sample number judging unit that judges whether or not the required number of samples of probe information has been collected, based on the sample collection number; and
a control unit that, responsive to a judgment that the required number of samples of probe information has been collected, controls generation of the traffic information for the link; and
wherein the road categories include a road having one lane and a road having two or more lanes, and the sample collection number for a road having two or more lanes is set to a smaller number than the sample collection number for a road having one lane.

* * * * *